US012586162B2

(12) United States Patent
Paz et al.

(10) Patent No.: US 12,586,162 B2
(45) Date of Patent: Mar. 24, 2026

(54) JITTER ESTIMATION USING PHYSICAL CONSTRAINTS

(71) Applicant: QUALCOMM Incorporated, San Diego, CA (US)

(72) Inventors: Ophir Paz, Floirac (FR); Gary Franklin Gimenez, Bordeaux (FR)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 18/320,098

(22) Filed: May 18, 2023

(65) Prior Publication Data

US 2024/0386532 A1     Nov. 21, 2024

(51) Int. Cl.
| | |
|---|---|
| *G06T 5/70* | (2024.01) |
| *G06T 7/70* | (2017.01) |
| *G06V 10/46* | (2022.01) |
| *G06V 10/98* | (2022.01) |

(52) U.S. Cl.
CPC ................. *G06T 5/70* (2024.01); *G06T 7/70* (2017.01); *G06V 10/462* (2022.01); *G06V 10/993* (2022.01)

(58) Field of Classification Search
CPC ........... G06T 5/70; G06T 7/70; G06V 10/462; G06V 10/993
See application file for complete search history.

(56) References Cited

U.S. PATENT DOCUMENTS

2018/0365853 A1    12/2018    Yang et al.

FOREIGN PATENT DOCUMENTS

CN        106411952 A  *  2/2017  ............ G06F 21/32

OTHER PUBLICATIONS

Xi, Chenxuan, et al. "Real-time hand tracking using kinect." Proceedings of the 2nd international conference on digital signal processing. 2018. (Year: 2018).*
Jingyao, Wang, Yu Naigong, and Essaf Firdaous. "Gesture recognition matching based on dynamic skeleton." 2021 33rd Chinese Control and Decision Conference (CCDC). IEEE, 2021. (Year: 2021).*
Batmaz, A. U., et al. "Rotational and Positional Jitter in Virtual Reality Interaction in Everyday VR", Everyday Virtual and Augmented Reality, 2023 (Year: 2023).*
International Search Report and Written Opinion—PCT/US2024/029480—ISA/EPO—Aug. 9, 2024.

(Continued)

*Primary Examiner* — Matthew C Bella
(74) *Attorney, Agent, or Firm* — QUALCOMM Incorporated

(57) ABSTRACT

Techniques and systems are provided for pose prediction. For instance, a process can include a process for jitter correction. The process includes receiving a set of keypoints for an articulated object, wherein keypoints of the set of keypoints correspond to joints of the articulated object; determining a first keypoint of the set of keypoints is associated with a second keypoint of the set of keypoints; determining there is jitter associated with the first keypoint based on a comparison of a length between the first keypoint and the second keypoint to an expected length; and applying a filter to a location of the first keypoint based on the determination that there is jitter associated with the first keypoint.

30 Claims, 11 Drawing Sheets

(56) References Cited

OTHER PUBLICATIONS

Jiang W., et al., "Towards 3D Human Pose Construction Using WiFi", Proceedings of the 26th Annual International Conference on Mobile Computing and Networking, Acmpub27, New York, NY, USA, Apr. 16, 2020, 14 Pages, XP058463925, sections 3.3, 6.2.

Li R., et al., "Constraint-Based Optimized Human Skeleton Extraction from Single-Depth Camera", Sensors, vol. 19, No. 11, Jun. 7, 2019, p. 2604, XP093176046, pp. 1-20, CH, sections 2, 3.1, 4, 4.1-4.4, figures 4, 18.

Loumponias K., et al., "Using Tobit Kalman Filtering in Order to Improve the Motion Recorded by Microsoft Kinect", Proc. 8th International Workshop on Applied Probability (IWAP2016), Jun. 20, 2016, 10 Pages, XP093189798, abstract.

* cited by examiner

400

402

404

406

408

Keypoints With Jitter

Keypoints In Motion

700
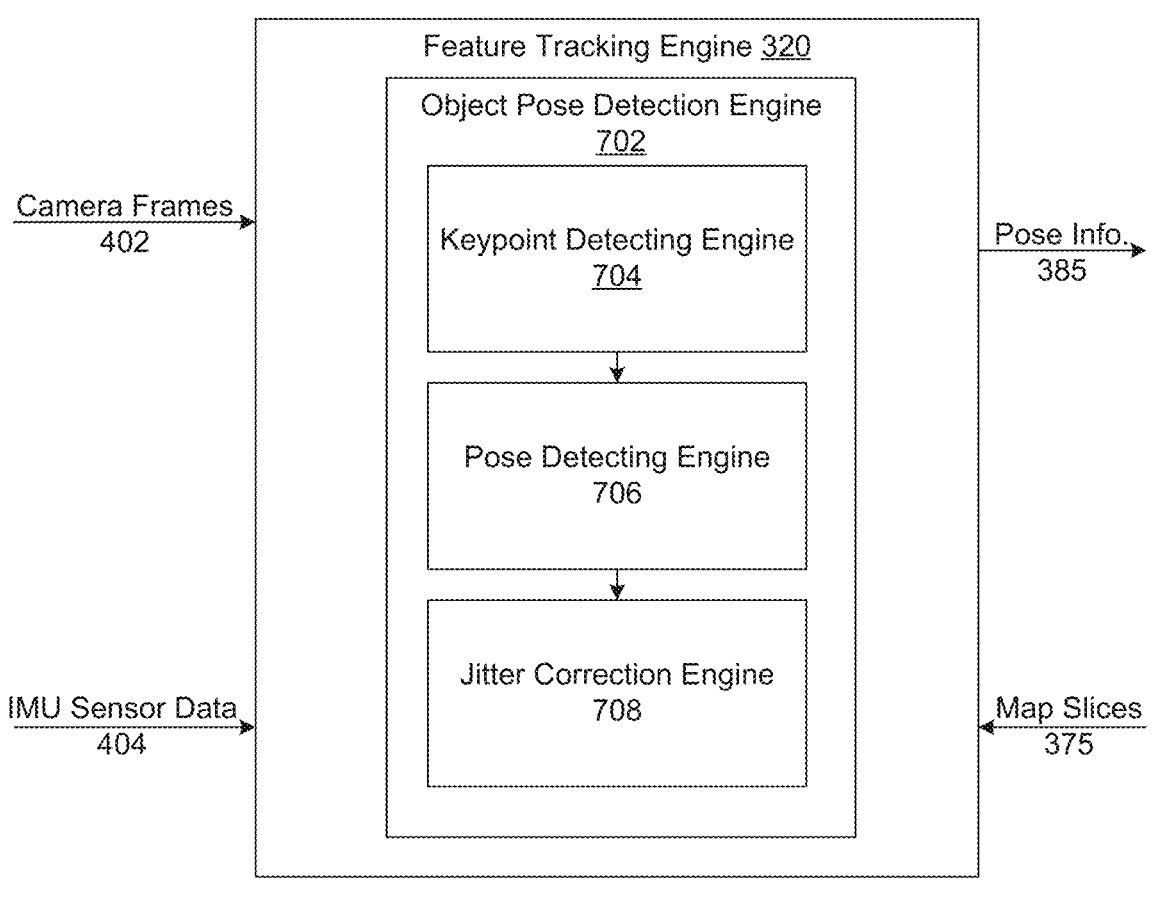
Camera Frames
402
IMU Sensor Data
404
Feature Tracking Engine 320
Object Pose Detection Engine
702
Keypoint Detecting Engine
704
Pose Detecting Engine
706
Jitter Correction Engine
708
Pose Info.
385
Map Slices
375
FIG. 7

800

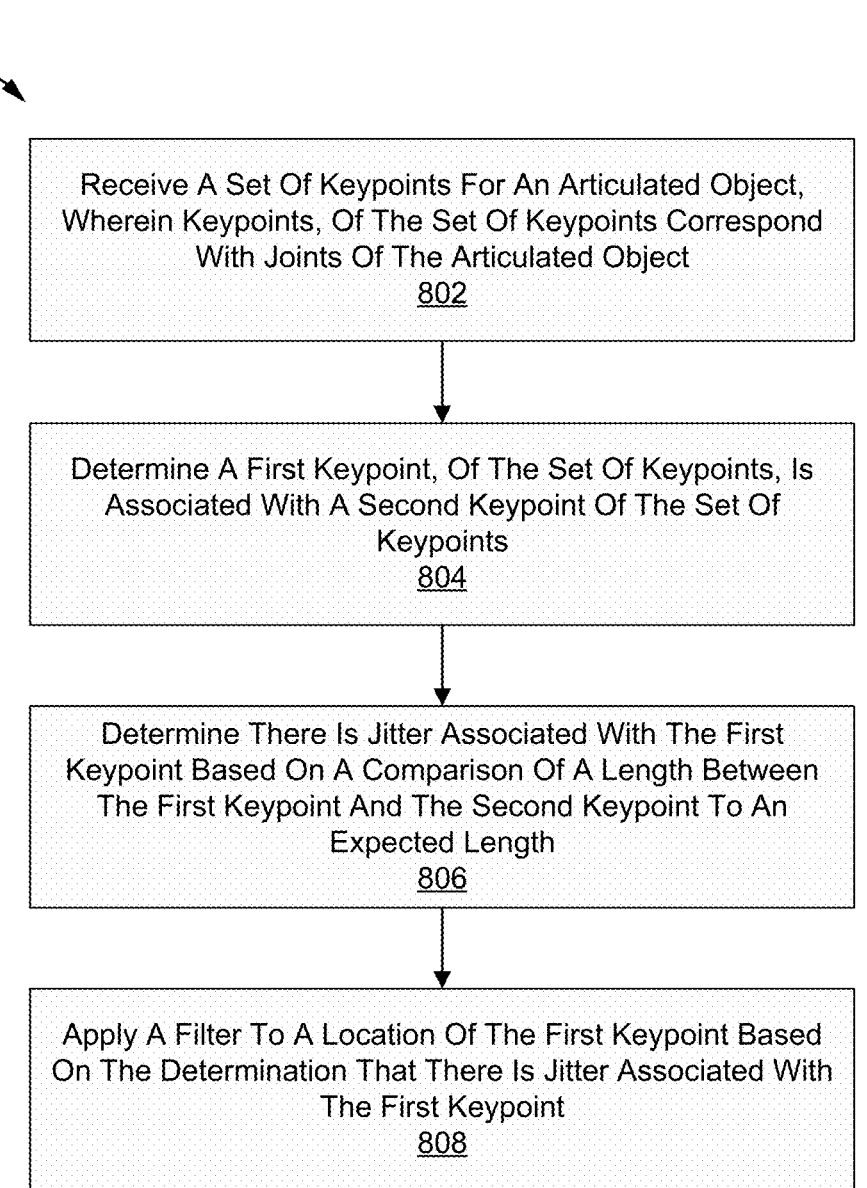

Receive A Set Of Keypoints For An Articulated Object,
Wherein Keypoints, Of The Set Of Keypoints Correspond
With Joints Of The Articulated Object
802

Determine A First Keypoint, Of The Set Of Keypoints, Is
Associated With A Second Keypoint Of The Set Of
Keypoints
804

Determine There Is Jitter Associated With The First
Keypoint Based On A Comparison Of A Length Between
The First Keypoint And The Second Keypoint To An
Expected Length
806

Apply A Filter To A Location Of The First Keypoint Based
On The Determination That There Is Jitter Associated With
The First Keypoint
808

FIG. 8

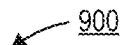
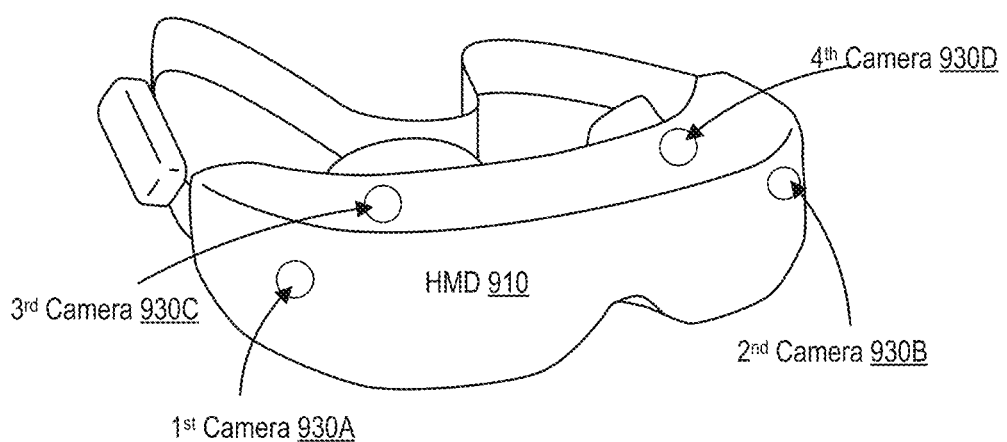
FIG. 9A
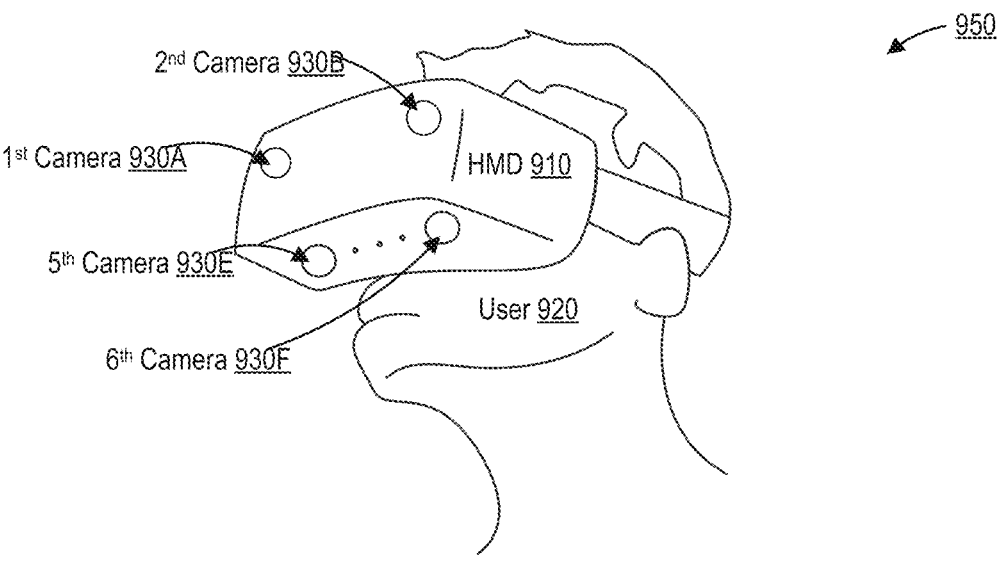
FIG. 9B

1000
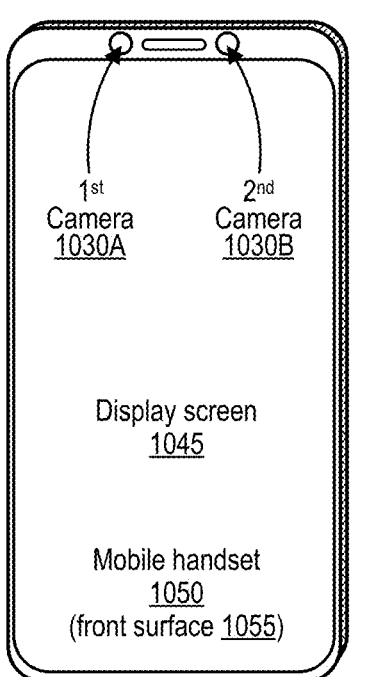
1st
Camera
1030A
2nd
Camera
1030B
Display screen
1045
Mobile handset
1050
(front surface 1055)
FIG. 10A
1010
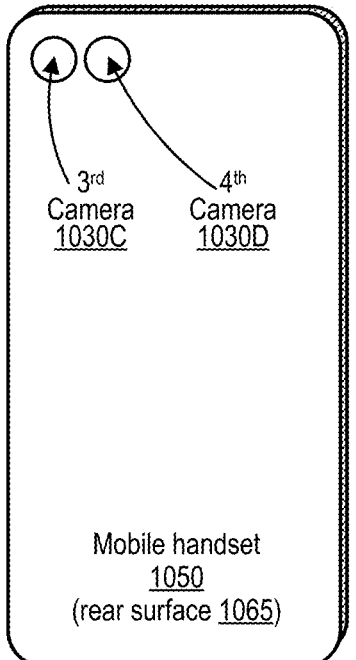
3rd
Camera
1030C
4th
Camera
1030D
Mobile handset
1050
(rear surface 1065)
FIG. 10B

JITTER ESTIMATION USING PHYSICAL CONSTRAINTS

FIELD

This application is related to processing one or more images for object tracking systems. For example, aspects of the application relate to systems and techniques for jitter estimation using physical constraints.

BACKGROUND

Degrees of freedom (DoF) refer to the number of basic ways a rigid object can move through three-dimensional (3D) space. In some examples, six different DoF can be tracked. The six DoF include three translational DoF corresponding to translational movement along three perpendicular axes, which can be referred to as x, y, and z axes. The six DoF include three rotational DoF corresponding to rotational movement around the three axes, which can be referred to as pitch, yaw, and roll. Some extended reality (XR) devices, such as virtual reality (VR) or augmented reality (AR) headsets, can track some or all of these degrees of freedom. For instance, a 3DoF XR headset typically tracks the three rotational DoF, and can therefore track whether a user turns and/or tilts their head. A 6DoF XR headset tracks all six DoF, and thus also tracks a user's translational movements.

XR systems typically use powerful processors to perform feature analysis (e.g., extraction, tracking, etc.) and other complex functions quickly enough to display an output based on those functions to their users. Powerful processors generally draw power at a high rate. Similarly, sending large quantities of data to a powerful processor typically draws power at a high rate. Headsets and other portable devices typically have small batteries so as not to be uncomfortably heavy to users. Thus, some XR systems must be plugged into an external power source, and are thus not portable.

SUMMARY

Systems and techniques are described herein for object tracking. For example, aspects of the present disclosure relate to systems and techniques for jitter estimation using physical constraints, such as by dynamically detecting and filtering jitter for an articulated 3 dimensional (3D) object based on physical constraints of the 3D object, just as lengths as between keypoints.

In one illustrative example, an apparatus for jitter correction is provided. The apparatus includes at least one memory and at least one processor coupled to the at least one memory. The at least one processor is configured to: receive a set of keypoints for an articulated object, wherein keypoints of the set of keypoints correspond to joints of the articulated object; determine a first keypoint of the set of keypoints is associated with a second keypoint of the set of keypoints; determine there is jitter associated with the first keypoint based on a comparison of a length between the first keypoint and the second keypoint to an expected length; and apply a filter to a location of the first keypoint based on the determination that there is jitter associated with the first keypoint.

As another example, a method for jitter correction is provided. The method includes: receiving a set of keypoints for an articulated object, wherein keypoints of the set of keypoints correspond to joints of the articulated object; determining a first keypoint of the set of keypoints is associated with a second keypoint of the set of keypoints; determining there is jitter associated with the first keypoint based on a comparison of a length between the first keypoint and the second keypoint to an expected length; and applying a filter to a location of the first keypoint based on the determination that there is jitter associated with the first keypoint.

In another example, a non-transitory computer-readable medium is provided. The non-transitory computer-readable medium has stored thereon instructions that, when executed by at least one processor, cause the at least one processor to: receive a set of keypoints for an articulated object, wherein keypoints of the set of keypoints correspond to joints of the articulated object; determine a first keypoint of the set of keypoints is associated with a second keypoint of the set of keypoints; determine there is jitter associated with the first keypoint based on a comparison of a length between the first keypoint and the second keypoint to an expected length; and apply a filter to a location of the first keypoint based on the determination that there is jitter associated with the first keypoint.

As another example, an apparatus for jitter correction is provided. The apparatus includes: means for receiving a set of keypoints for an articulated object, wherein keypoints of the set of keypoints correspond to joints of the articulated object; means for determining a first keypoint of the set of keypoints is associated with a second keypoint of the set of keypoints; means for determining there is jitter associated with the first keypoint based on a comparison of a length between the first keypoint and the second keypoint to an expected length; and means for applying a filter to a location of the first keypoint based on the determination that there is jitter associated with the first keypoint.

In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 7 is a block diagram illustrating a system implementing techniques for jitter estimation using physical constraints, in accordance with aspects of the present disclosure.

FIG. 8 is a flow diagram illustrating a technique for pose prediction, in accordance with aspects of the present disclosure.

FIG. 9A is a perspective diagram illustrating a head-mounted display (HMD) that performs feature tracking and/or visual simultaneous localization and mapping (VSLAM), in accordance with some examples.

FIG. 9B is a perspective diagram illustrating the head-mounted display (HMD) of FIG. 8A being worn by a user, in accordance with some examples.

FIG. 10A is a perspective diagram illustrating a front surface of a mobile device that performs feature tracking and/or visual simultaneous localization and mapping (VSLAM) using one or more front-facing cameras, in accordance with some examples.

FIG. 10B is a perspective diagram illustrating a rear surface of a mobile device, in accordance with aspects of the present disclosure.

DETAILED DESCRIPTION

Figure 1:
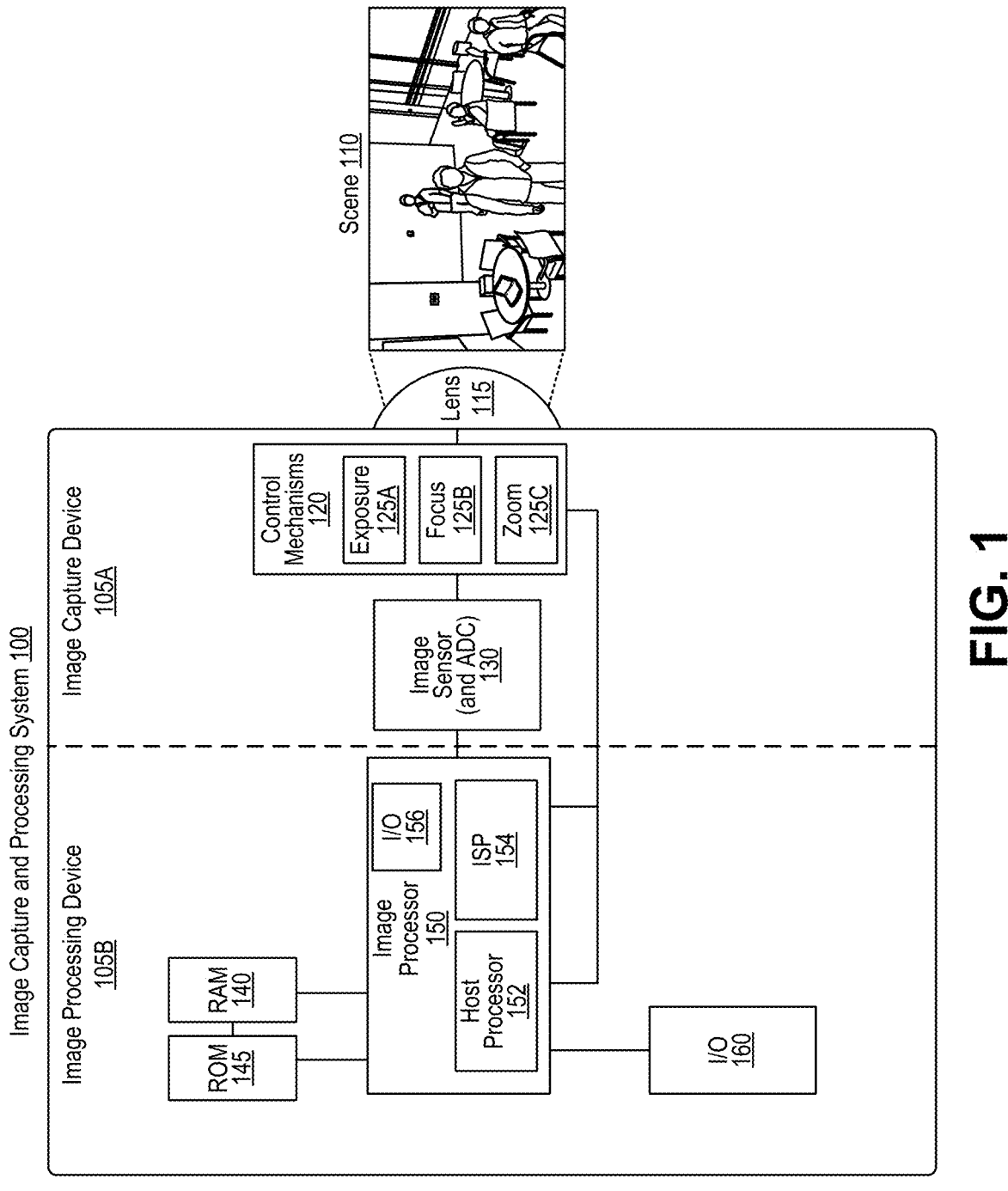
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

A camera (e.g., image capture device) is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Degrees of freedom (DoF) refer to the number of basic ways a rigid object can move through three-dimensional (3D) space. In some cases, six different DoF can be tracked. The six degrees of freedom include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as pitch, yaw, and roll.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

In some cases, jitter can cause errors for keypoint detection as well as other downstream systems, such as gesture detection, collision detection, object selection, and the like. In some cases, the jitter may refer to, for example, variation in a signal from a sensor or an electronic system associated with a sensor. This variation in the signal can make it difficult to accurately determine keypoints for an object in a scene and track the object over time. In some cases, to help reduce the impact of jitter, smoothing may be applied, for example, to detected keypoints. However, it may be difficult to distinguish jitter from actual movements, such as for a hand, as the jitter and the actual object movements may have similar displacement and/or velocity properties. Thus, applying a fixed amount of smoothing, for example, based on an amount of velocity/acceleration, may result in slowed down or filtered motion. In some cases, to avoid this slowed or filtered (e.g., stutter step) motion, smoothing may be applied dynamically based on an amount of jitter estimated using physical constraints Systems, apparatuses, methods (also referred to as processes), and computer-readable media (collectively referred to herein as "systems and techniques") are described herein for jitter estimation using physical constraints. In some aspects, the systems and techniques can determine whether there may be jitter in an object based on physical constraints of the object. These physical constraints may be described with respect to detected keypoints of the object. In some cases, detected keypoints may correspond to joints of the object. Generally, for an object, joints are physically constrained at least by rigid portions between and connecting different joints. For example, two joints may be connected by a rigid portion, such as a bone. The rigid portion between the two joints may have a fixed length (e.g., an expected length). Another example of a physical constraints may include an angle between neighboring joints (e.g., neighboring keypoints), a relative angle between neighboring joints, or any combination of physical constraints.

In some cases, information about the physical constraints may be measured and compared to expected measurements to determine whether movement of a keypoint may be due to movement of the object, or jitter. As an example, for a first keypoint, that has moved relative to a corresponding keypoint at a previous point in time, a length between the first keypoint and a second keypoint may be measured. This measured length may be compared to an expected length. A difference between the measured length and the expected length may be considered to be an estimated amount of jitter. If the measured length matches the expected length (e.g., there is no difference between the measured length and the expected length), then the movement of the first keypoint may be considered movement of the object. In some cases, if there is movement of the first keypoint due jitter, the jitter may be smoothed, for example, using any smoothing filter. An amount of smoothing to be applied may be based on the estimated amount of jitter.

The systems and techniques described herein provide advantages over existing solutions. For example, by selectively applying smoothing based on estimated jitter, actual motion of the object may be preserved. Further, by allowing an amount of smoothing to be adjusted based on an estimated amount of jitter, the smoothing may be better tailored to areas in which smoothing is needed and how much is needed, rather than applying a global amount of smoothing.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 11:
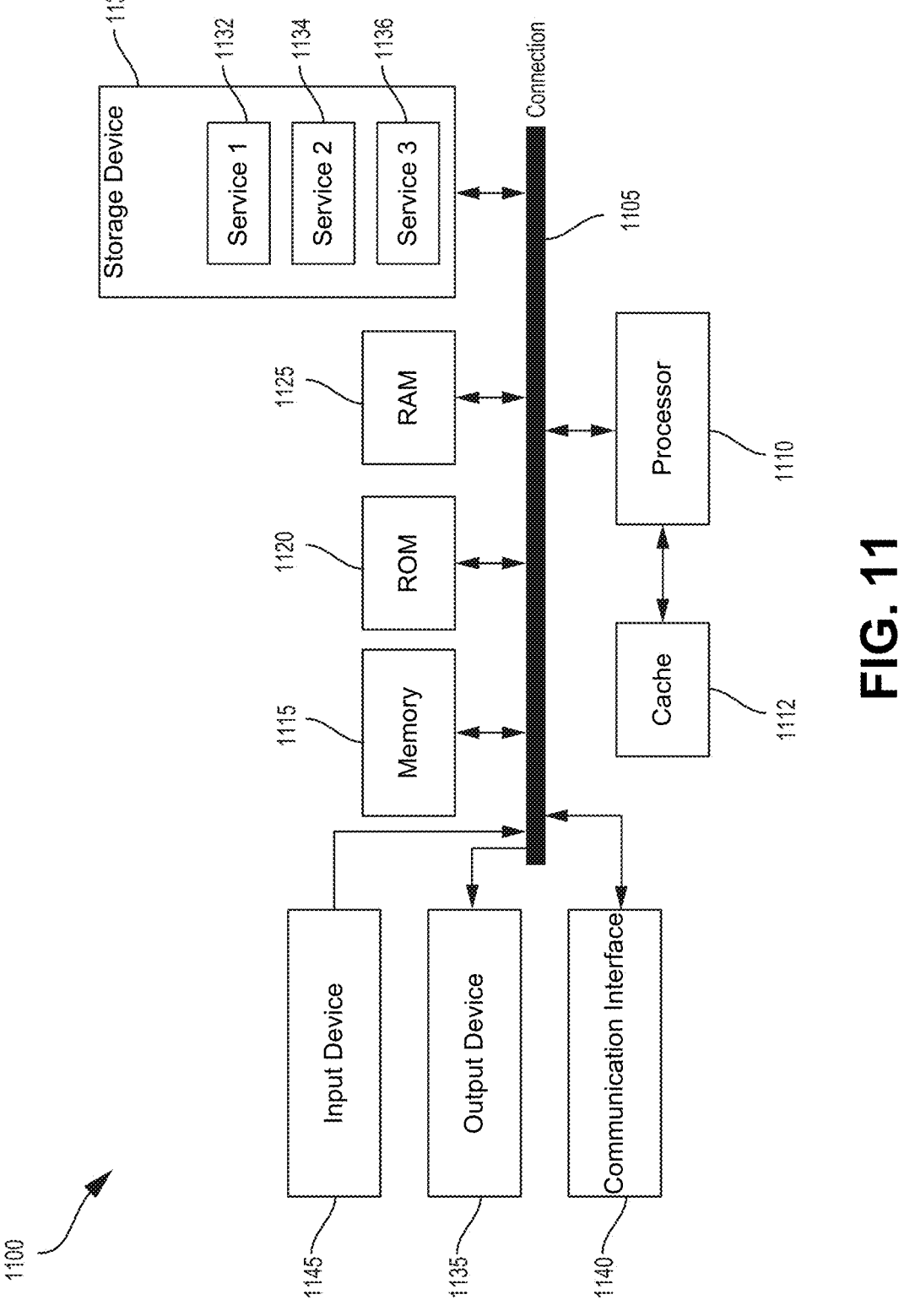
FIG. 11 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1110 discussed with respect to the computing system 1100 of FIG. 11. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, readonly memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1135, any other input devices 1145, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
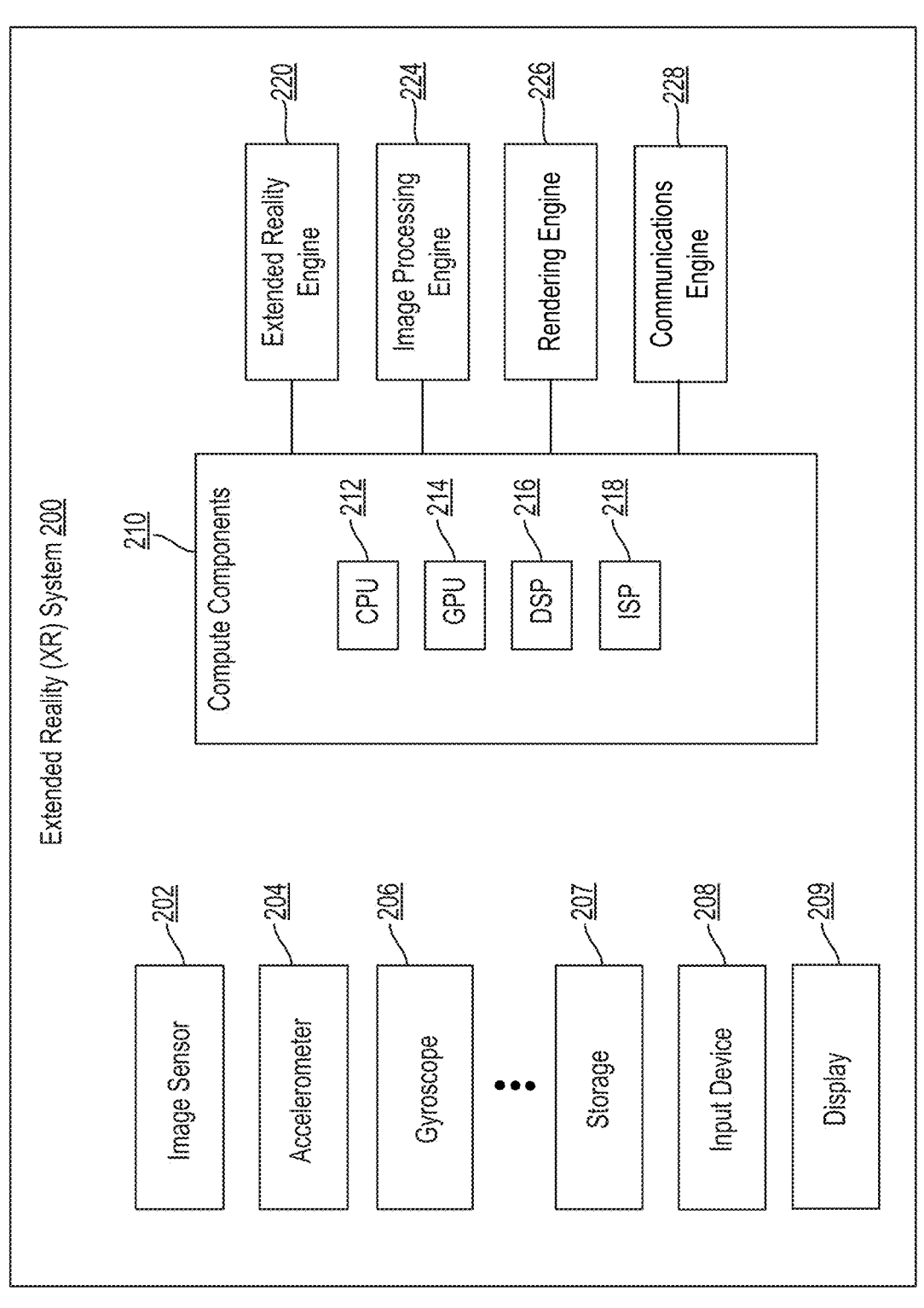
FIG. 2 is a diagram illustrating an architecture of an example extended reality (XR) system, in accordance with some aspects of the disclosure.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touch-screen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1145 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1040 of FIG. 10.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
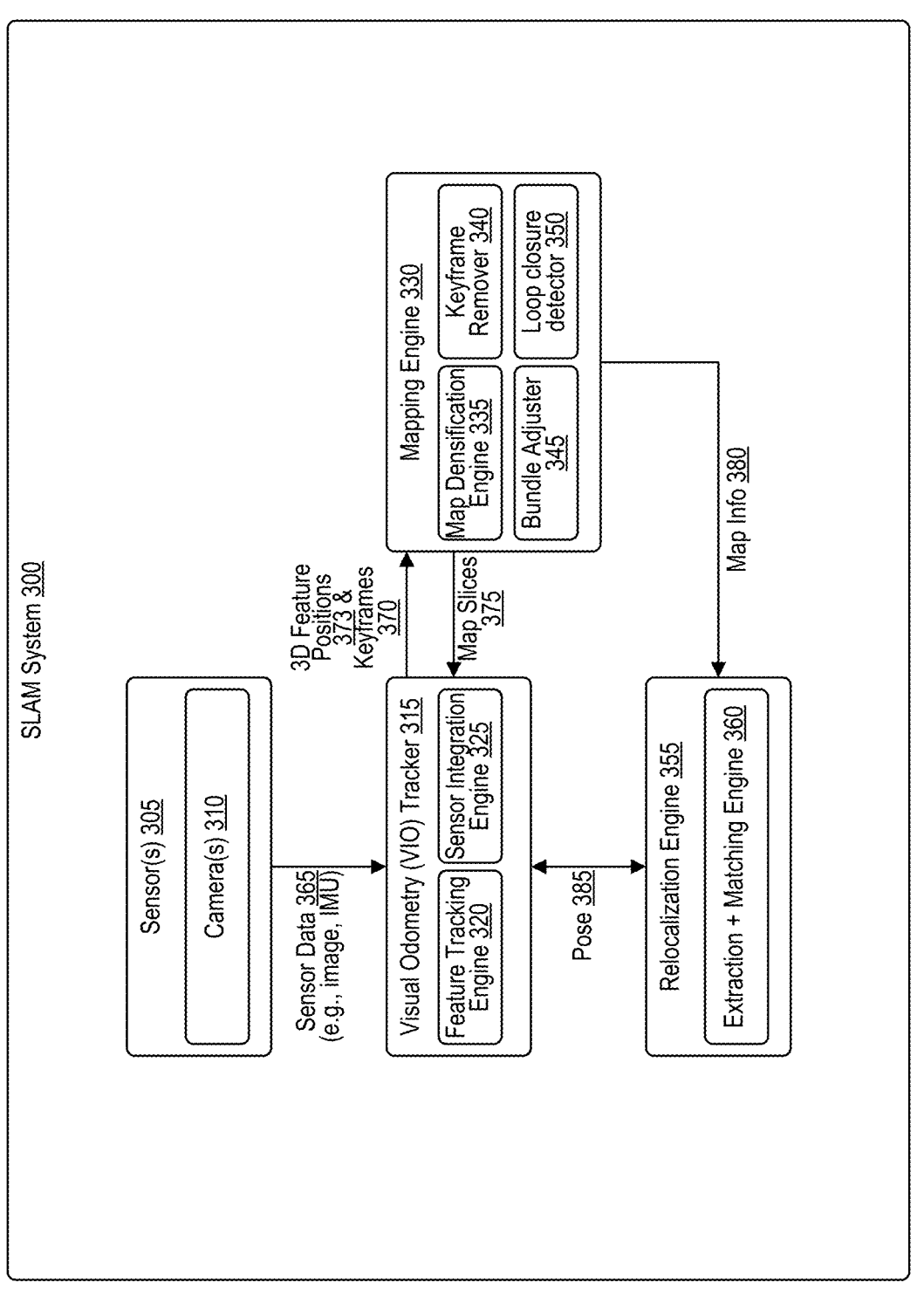
FIG. 3 is a block diagram illustrating an architecture of a simultaneous localization and mapping (SLAM) system, in accordance with aspects of the present disclosure.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image and capture to acquisition or capture of a second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 373 of a particular feature. The 3D feature positions 373 can include one or more 3D feature positions and can also be referred to as 3D feature points. The 3D feature positions 373 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. A keyframe (from one or more keyframes 370) corresponding to a particular feature may be an image in which the particular feature is clearly depicted. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 373 of the particular feature when considered by the feature tracking engine 320 and/or the sensor integration engine 325 for determination of the 3D feature positions 373. In some examples, a keyframe corresponding to a particular feature also includes data associated with the pose 385 of the SLAM system 300 and/or the camera(s) 310 during capture of the keyframe. In some examples, the VIO tracker 315 can send 3D feature positions 373 and/or keyframes 370 corresponding to one or more features to the mapping engine 330. In some examples, the VIO tracker 315 can receive map slices 375 from the mapping engine 330. The VIO tracker 315 can feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 generates a 3D map of the environment based on the 3D feature positions 373 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 373. The map information 380 can include one or more keyframes 370 corresponding to certain features and certain 3D feature positions 373.

The SLAM system 300 also includes a relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can by extract features from an image captured by the cameras 310 of the SLAM system 300 while the SLAM system 300 is at a current pose 385, and can match the extracted features to features depicted in different keyframes 370, identified by 3D feature positions 373, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trained machine learning models, one or more trained neural networks, or a combination thereof. The VIO tracker 315 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

As indicated above, a feature tracking engine 320, may perform feature tracking by recognizing features that were previously recognized in one or more previous images. In some cases, as a part of feature tracking, the feature tracking engine 320 may also estimate and/or track a pose of objects and features in the environment. For example, pose estimation may infer (e.g., estimate) a position of another object. In some cases, this estimation may be relative to the system and/or a user of the system. In some examples, pose estimation may be performed for an articulated object based on a set of keypoints for the object. The estimated pose of objects may also be used for a variety of operations, such as gesture detection, collision detection, user interfacing, and the like.

Figure 4:
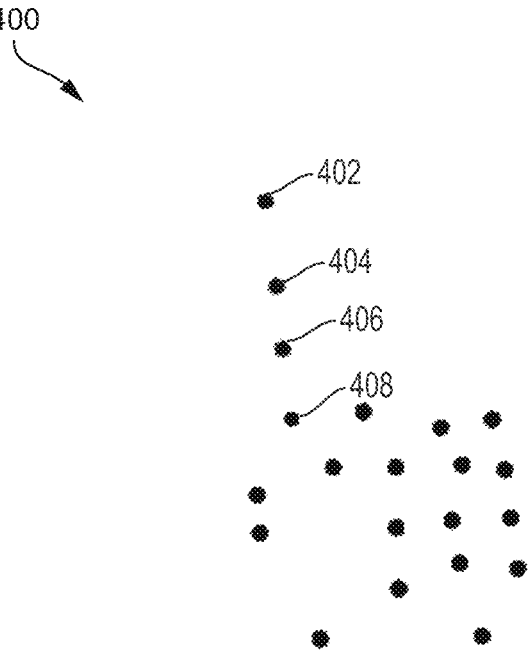
FIG. 4 is a block diagram illustrating a system for pose estimation, in accordance with aspects of the present disclosure.

FIG. 4 illustrates a set of keypoints 400 for a hand, in accordance with aspects of the present disclosure. Keypoints may be points of interest of an object. For articulated objects, that is, objects which include joints which allow parts of the object to move, some keypoints may correspond to joints as well as other points of interest and/or features. Examples of articulated objects may include animals with a skeleton, devices which include a hinge or other joint, and the like. As a more specific example, a pose of fingers of a hand may be estimated using keypoints at a tip of the finger 402, a first knuckle 404 (e.g., the distal interphalangeal joint or first finger knuckle), a second knuckle 406 (e.g., the proximal interphalangeal joint, major finger knuckle, or second finger knuckle), and a third knuckle 408 (e.g., the metacarpophalangeal joint, second major finger knuckle or third finger knuckle). Thus, pose estimation may be performed using a certain set of predetermined keypoints for an object, such as a hand. In some cases, keypoints may be detected based on information about the object. Examples of information about the object may include one or more images of the object or other types of data regarding of the object, such as from a lidar or radar scan. In some cases, one or more machine learning models may be used to detect keypoints of objects from the information about the object.

In some cases, jitter can cause errors for keypoint detection as well as other downstream systems, such as gesture detection, collision detection, object selection, and the like. In some cases, this jitter may be due to, for example, variations in a signal for a sensor or an electronic system associated with a sensor and this jitter may make it difficult to accurately determine keypoints for an object and track the object over time. In some cases, to help reduce the impact of jitter, smoothing may be applied, for example, to detected keypoints. However, it may be difficult to distinguish jitter from actual movements, such as for a hand, as the jitter and the actual object movements may have similar displacement and/or velocity properties. Thus, applying a fixed amount of smoothing, for example, based on an amount of velocity/ acceleration, may result in slowed down or filtered motion. In some cases, to avoid this slowed or filtered (e.g., stutter step) motion, smoothing may be applied dynamically based on an amount of jitter estimated using physical constraints.

Figures 5A, 5B, 5C:
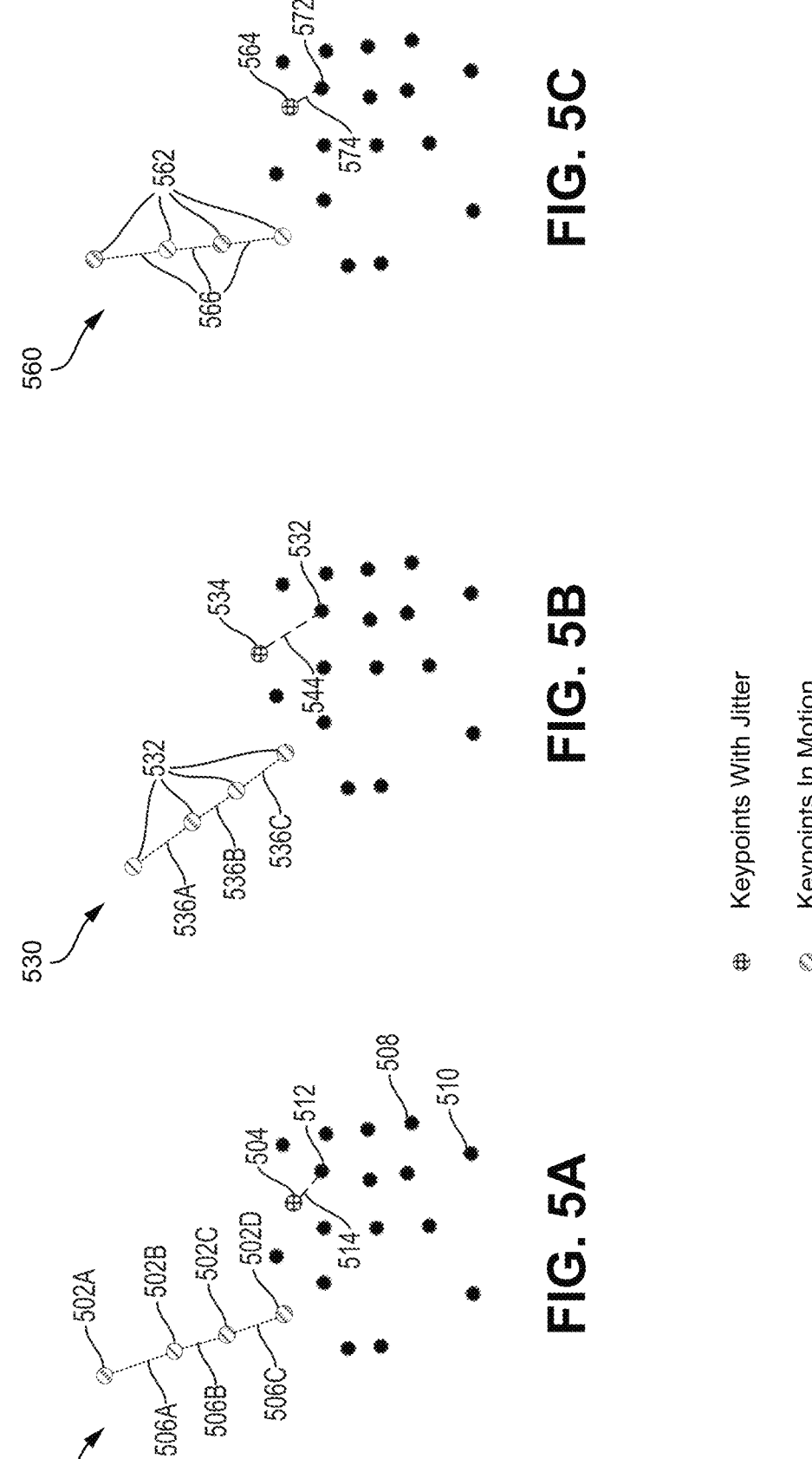
FIGS. 5A, 5B, and 5C illustrate sets of keypoints for a hand, in accordance with aspects of the present disclosure.

FIGS. 5A, 5B, and 5C illustrate sets of keypoints for a hand, in accordance with aspects of the present disclosure. In some cases, jitter may be estimated based on a model of physical constraints for an articulated object. The physical constraints, as described by the model, may indicate whether a certain detected movement may be the result of jitter or regular motion of the articulated object. As an example, for an articulated object, neighboring joints may be connected together by a rigid portion of a certain, constant, length. As a more specific example, a distance (e.g., length) between the third knuckle and the second knuckle of a specific finger of a person typically does not change. Thus, in some cases, jitter may be detected by evaluating whether there is a variation in lengths (e.g., from an expected length or a previous length) between certain keypoints. In some cases, the length between keypoints may be dynamically determined based on the pose of the articulated object. For example, pose information about the articulated object may estimate the position of the articulated object in a three-dimensional space. Detected keypoints may also be projected to the three-dimensional space and lengths between the keypoints in the three-dimensional space may be measured. While discussed in the context of a variation in length as between keypoints, it may be understood that the techniques discussed herein may not be limited to variations in length, but instead may apply to any physical constraint as between keypoints, such as an angle between keypoints, or any combination of physical constraints.

FIG. 5A illustrates a set of keypoints 500 for a hand in at a first time. The set of keypoints 500 may represent a hand, such as a left hand, with an extended index finger. In some cases, a ML model trained to identify joints of a hand, among other possible objects, as keypoints for the set of keypoints 500 may be detected. Thus, keypoints 502A, 502B, 502C, and 502D (collectively keypoints 502) may correspond to an index finger and keypoint 504 may correspond to a third knuckle of a ring finger. The keypoints 502 may each be separated by a certain length from a neighboring, associated, keypoints. In some cases, neighboring keypoints may be associated if the neighboring keypoints are connected by a rigid potion. For example, keypoint 502A may be associated with keypoint 502B as they are connected by a rigid portion (e.g., a bone) having a first length 506A. Similarly, keypoint 502B may also be associated with keypoint 502C and keypoint 502B may be separated from keypoint 502C be a second length 506B, and so forth. As another example, keypoint 504 may be connected to keypoint 512 (e.g., a second knuckle of the ring finger) by a rigid portion of a third length 514. In some cases, a keypoint may not be associated with a neighboring keypoint, such as keypoint 508, which may correspond to a tip of a pinky finger, and keypoint 510, which may correspond with a tip of a ring finger, as keypoints 508 and 510 are not coupled by a rigid portion.

In FIG. 5B, the index finger has moved to the left, as shown by keypoints 530 of the set of keypoints 530. However, as lengths 536A, 536B, and 536C between keypoints 530 are unchanged as between corresponding lengths 506A, 506B, and 506C (collectively lengths 506), respectively, the movement of keypoints 502 may be determined not to be jitter, but motion of the finger of the hand. In FIG. 5B, keypoint 534 has moved in a downward direction as compared to keypoint 504 of FIG. 5A. In this example, a length 544 as between keypoint 534 and keypoint 532 has changed as compared to third length 514 of FIG. 5A. In some examples, keypoints which have movement, as between a first set of keypoints and a second set of keypoints (e.g., between keypoints 500 and 530) may be checked for jitter. In some cases, the movement of keypoint 534 may be determined to be jitter based on a change in length. A filter may be applied to smooth the movement of keypoint 534 as between FIG. 5A at the first time and FIG. 5B at the second time. In FIG. 5C, the index finger, as shown by keypoints 562 of the set of keypoints 560, has moved to the right. For FIG. 5C, as the lengths 566 between keypoints 562 are unchanged between corresponding lengths 506, the movement of keypoints 562 may be determined not to be jitter. Similarly, as the length 574 between keypoint 564 and keypoint 572 is the same as third length 514, the movement of keypoint 564 (e.g., as compared to keypoint 534) may be determined not to be jitter.

In some cases, associated keypoints (e.g., between keypoint 502A and keypoint 502B, keypoint 504 and keypoint 512, etc.) may be predetermined for an articulated object, such as a hand. For example, associated keypoint corresponding to joints coupled by a rigid portion may be predetermined for an object being tracked. In some cases, lengths as between associated keypoints may also be predetermined. For example, an expected length (e.g., calibrated length) between associated keypoints may be determined and stored along with an indication of associated keypoints. In some cases, measured distanced between keypoints may be provided by, for example, a ML model identifying keypoints. In some cases, keypoints may be associated and the expected lengths of portions between keypoints may be determined during a training procedure for the ML model. In some cases, the expected length may be a range of values.

Figures 6A, 6B:
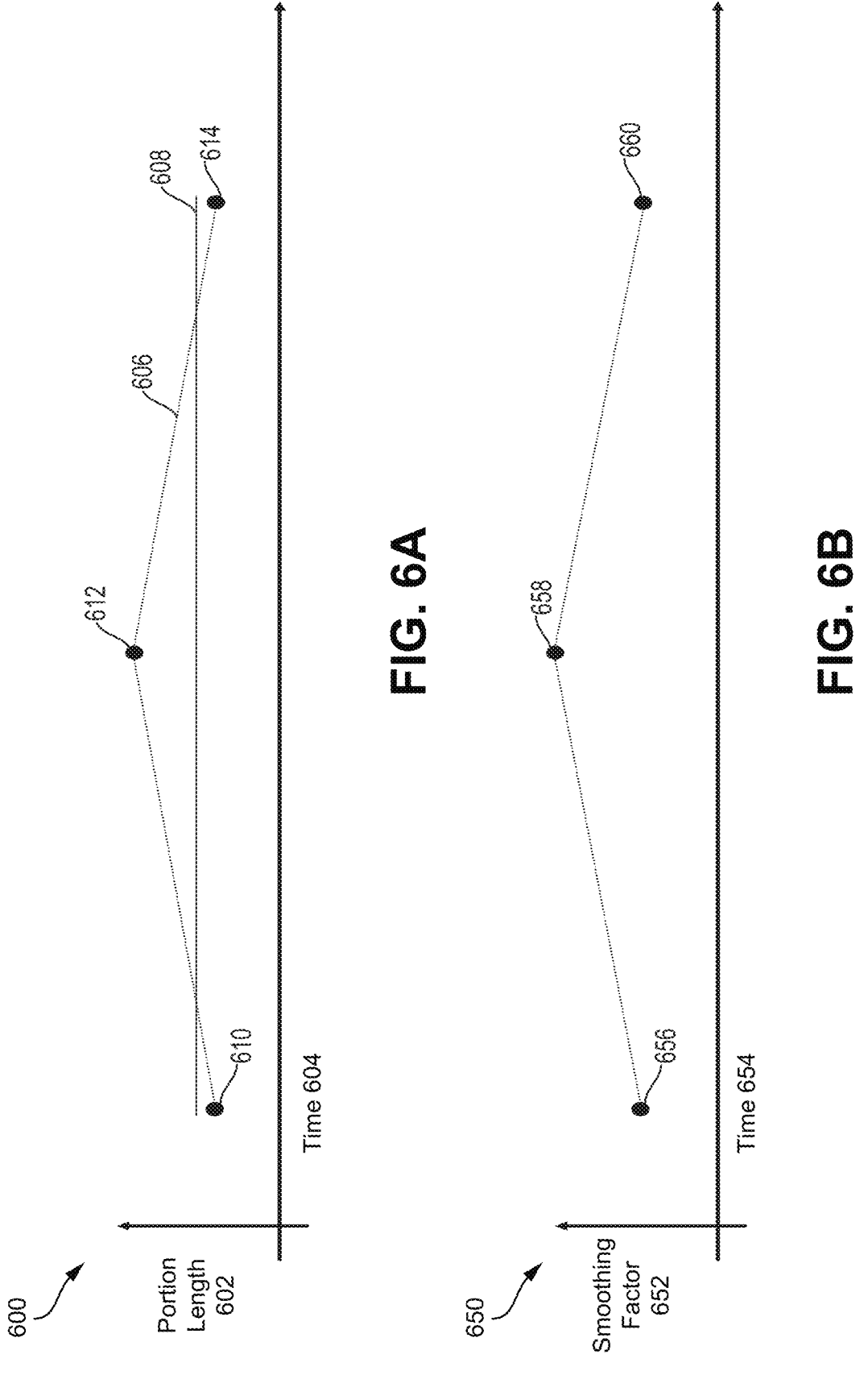
FIGS. 6A and 6B are charts illustrating smoothing based on a difference between the expected lengths and measured lengths, in accordance with aspects of the present disclosure.

In some cases, an amount of smoothing (e.g., filtering) applied to a keypoint determined to have jitter may be based on the expected length. FIGS. 6A and 6B are charts illustrating smoothing based on a difference between the expected lengths and measured lengths, in accordance with aspects of the present disclosure. Chart 600 of FIG. 6A includes a portion length 602 on a y-axis with respect to time

604 on an x-axis. In the example shown in chart 600, a measured length 606 of a portion between a third knuckle of a ring finger and a second knuckle of the ring finger (e.g., third length 514 of FIG. 5A as between keypoint 504 and keypoint 512, and corresponding portions and keypoints of FIG. 5B and FIG. 5C) is plotted for three frames (e.g., frames in which sets of keypoints 500, 530, and 560 are determined for). An expected length 608 for the portion between the third knuckle and the second knuckle of the ring finger is also plotted in chart 600. Chart 600 corresponds to chart 650 in FIG. 6B. Chart 650 includes a smoothing factor 652 on a y-axis with respect to time 654 on an x-axis. In some cases, the smoothing factor indicates an amount of smoothing applied to keypoints where a higher smoothing factor corresponds to more smoothing.

In chart 600, a first measured length 610, corresponding to length 514 of FIG. 5A, is less than the expected length 608, a second measured length 612, corresponding to length 544 of FIG. 5B, is greater than the expected length 608, and a third measured length 614, corresponding to length 574 of FIG. 5C, is less than the expected length 608. The first measured length 610 corresponds to a first smoothing factor 656, the second measured length 612 corresponds to a second smoothing factor 658, and the third measured length 614 corresponds to a third smoothing factor 660. As shown in FIGS. 6A and 6B, as the measured length (e.g., measured lengths 610, 612, and 614) gets further from the expected length 608, more smoothing (e.g., a higher smoothing factor) may be applied. In some cases, there may be a default amount of smoothing applied. In some cases, the default smoothing may be no smoothing, which may be applied if the measured length matches the expected length. In some cases, a determination that there is jitter for a keypoint may not be made (e.g., the movement is actual movement of the object) until a threshold distance between the measured portion length and expected portion length is met. For instance, the distance between the measured portion length and the expected portion length may need to be more than a threshold distance before a determination that there is jitter is made and the smoothing applied. In one illustrative example, a jitter correction engine (e.g., the jitter correction engine 708 of FIG. 7) may determine that there is jitter associated with (or for) a keypoint based on or when the distance between the measured portion length and the expected portion length is greater than the threshold distance. The threshold distance can be any suitable value and can be based on any suitable metric (e.g., 2 centimeters, 5 pixels, etc.).

In some cases, the smoothing factor applied may be a function of the difference between the expected lengths and measured lengths. For example, the smoothing factor applied may be described by:

$$\text{smooth}_{factor_i}(t) \approx \sum_j^{points\ connected\ to\ i} \frac{|l_{ij}(t) - L_{ij}|}{L_{ij}}, \quad \text{(Equation 1)}$$

where t is time, $L_{ij}$ is an expected length 608 (e.g., expected portion length) between keypoints i and j, and where $l_{ij}(t)$ is a measured length (at t) between keypoints i and j. In some cases, the smoothing factor may be applied based on a sum of all of difference between the expected lengths and measured lengths for a keypoint and associated neighbouring keypoints.

In some cases, the smoothing factor itself may be smoothed. For example, if there are multiple rapid changes in movement due to jitter over time, it may be useful to smooth applications of the smoothing to maintain coherence and smoothness of motion. In some cases, the smoothing factor may be smoothed using, for example, a lowpass filter, such as one described by the function $(SF_i(t) \approx \alpha \cdot SF_i(t-1) + (1-\alpha) \cdot \text{smooth\_factor}_i(t)$, where t is time, $\text{smooth\_factor}_i(t)$ is $\text{smooth}_{factor_i}(t)$ of Equation 1, and $\alpha$ is a constant factor that maybe be set based on a dynamic of the smoothing system that may be determined experimentally on a per system basis.

FIG. 7 is a block diagram illustrating a system 700 implementing techniques for jitter estimation using physical constraints, in accordance with aspects of the present disclosure. As discussed above with respect to FIG. 3, a feature tracking engine 320 may receive map slices 375, as well as camera frames and IMU sensor data (e.g., sensor data 365 of FIG. 3). In some cases, the camera frames may be received from one or more cameras (e.g., image capture device 105A of FIG. 1, image sensor 202 of FIG. 2, camera 310 of FIG. 3, cameras 930 of FIGS. 9A and 9B, cameras 1030 of FIGS. 10A and 10B) of an XR system (e.g., XR system 200 of FIG. 2). In some cases, the camera frames may also be displayed to a user of the XR system. In other cases, the XR system may include one or more cameras for performing localization and/or mapping.

The feature tracking engine 320 may include one or more systems for detecting and/or tracking objects in the environment. For example, the feature tracking engine 320 may include an object pose detection engine 702 to detect objects and determine a pose of these objects. Information about the objects, such as pose 385 information may be output and stored, for example, by a mapping engine (not shown).

In some cases, the object pose detection engine may include a keypoint detecting engine 704. The keypoint detecting engine 704 may include one or more ML models for detecting objects and detecting keypoints of the objects. In some cases, the keypoint detecting engine 704 may detect keypoints in three dimensions or in two dimensions. For example, keypoints may be described in a 3D space based on multiple images. The detected keypoints may be output to a pose detecting engine 706.

The pose detecting engine 706 may detect one or more poses of the objects based on the detected keypoints. In some cases, the detected poses may be relative to the XR system. The pose detecting engine 706 may output detected poses along with keypoint information to a jitter correction engine 708. The jitter correction engine 708 may implement techniques described above with respect to FIGS. 4-6 to estimate jitter in the detected poses and keypoints and smooth the jitter.

FIG. 8 is a flow diagram illustrating a process 800 for jitter correction. The process 800 may be performed by a computing device (or apparatus, e.g., image capture and processing system 100 of FIG. 1, XR system 200 of FIG. 2, SLAM system 300 of FIG. 3, HMD 910 of FIGS. 9A and 9B, mobile handset 1050 of FIGS. 10A and 10B, computing system 1100 of FIG. 11, etc.) or a component (e.g., a chipset, codec, etc.) of the computing device. The computing device may be a mobile device (e.g., a mobile phone, HMD 910 of FIGS. 9A and 9B, mobile handset 1050 of FIGS. 10A and 10B), a network-connected wearable such as a watch, an extended reality (XR) device (e.g., XR system 200 of FIG. 2, SLAM system 300 of FIG. 3, HMD 910 of FIGS. 9A and 9B, mobile handset 1050 of FIGS. 10A and 10B) such as a virtual reality (VR) device or augmented reality (AR) device, a vehicle or component or system of a vehicle, or other type of computing device. The operations of the process 800 may be implemented as software components that are executed and run on one or more processors (e.g., image processor 150 of FIG. 1, host processor 152 of FIG. 1, processor 1110 of FIG. 11, etc.).

At block 802, the computing device (or component thereof) may receive a set of keypoints (e.g., keypoints 502 of FIG. 5A, keypoints 532 of FIG. 5B, keypoints 562 of FIG. 5C) of for an articulated object, wherein keypoints of the set of keypoints correspond to joints of the articulated object. An articulated object may be an object which includes joints which allow parts of the object to move. In some cases, the keypoints are defined in a three-dimensional space. For example, the keypoints may be defined based on pose information that describes the location and position of an object a three-dimensional space. In some cases, the length between the first keypoint and the second keypoint is measured in the three-dimensional space.

At block 804, the computing device (or component thereof) may determine a first keypoint of the set of keypoints is associated with a second keypoint of the set of keypoints. In some cases, a first joint corresponding to the first keypoint of the articulated object is coupled to a second joint corresponding to the second keypoint of the articulated object by a rigid portion. In some cases, the first keypoint is associated with the second keypoint based on the coupling. In some cases, associations between keypoints are predetermined for the articulated object. In some cases, the articulated object comprises fingers of a hand. For example, a hand with fingers may be an articulated objects and the keypoints may be predetermined for the hand as corresponding to certain joints of the hand and fingers (e.g., FIGS. 5A-5C).

At block 806, the computing device (or component thereof) may determine there is jitter associated with the first keypoint based on a comparison of a length (e.g., length 544 of FIG. 5) between the first keypoint and the second keypoint to an expected length. In some cases, the smoothing factor is determined based on a sum of differences between an expected length (e.g., expected length 608 of FIG. 6) and a measured length (e.g., measured lengths 610, 612, and 614 of FIG. 6) for the first keypoint and associated neighboring keypoints. In some cases, the computing device (or component thereof) may determine there is jitter associated with the first keypoint, by: obtaining a measured length between the first keypoint and the second keypoint; obtaining an expected length between the first keypoint and the second keypoint; and determining there is jitter associated with the first keypoint based on a difference between the measured length and the expected length. In some cases, the computing device (or component thereof) may determine that the difference between the measured length and the expected length is greater than a threshold distance and determine that there is jitter associated with the first keypoint based on determining that the difference between the measured length and the expected length is greater than the threshold distance. In some cases, the computing device (or component thereof) may obtain a measured length between a third keypoint and a fourth keypoint, obtain an expected length between the third keypoint and the fourth keypoint, determine that the measured length matches the expected length and determine that there is no jitter associated with the third keypoint based on determining that the measured length matches the expected length.

At block 808, the computing device (or component thereof) may apply a filter to a location of the first keypoint based on the determination that there is jitter associated with the first keypoint. In some cases, the computing device (or component thereof) may, apply a filter based on the determination there is jitter associated with the first keypoint. This filter may allow the jitter to be smoothed to help avoid errors that may be induced by the jitter. In some cases, the computing device (or component thereof) may apply the filter by determining a smoothing factor (e.g., smoothing factor 652 of FIG. 6) based on determination that there is jitter associated with the first keypoint and smooth a movement of the first keypoint based on the determined smoothing factor. In some cases, the computing device (or component thereof) may estimate a pose of the articulated object based on the applied filter.

FIG. 9A is a perspective diagram 900 illustrating a head-mounted display (HMD) 910 that performs feature tracking and/or visual simultaneous localization and mapping (VSLAM), in accordance with some examples. The HMD 910 may be, for example, an augmented reality (AR) headset, a virtual reality (VR) headset, a mixed reality (MR) headset, an extended reality (XR) headset, or some combination thereof. The HMD 910 may be an example of an XR system 200, a SLAM system 300, or a combination thereof. The HMD 910 includes a first camera 930A and a second camera 930B along a front portion of the HMD 910. The first camera 930A and the second camera 930B may be two of the one or more cameras 310. In some cases, the HMD 910 may also include a third camera 930C, fourth camera 930D, fifth camera (not visible), and sixth camera (not visible). In some cases, the third camera 930C, fourth camera 930D, fifth camera (not visible), and sixth camera (not visible) may be four of the one or more cameras 310 and these cameras. In some examples, the HMD 910 may only have a single camera. In some examples, the HMD 910 may include one or more additional cameras in addition to the first camera 930A and the second camera 930B. In some examples, the HMD 910 may include one or more additional sensors in addition to the first camera 930A and the second camera 930B.

FIG. 9B is a perspective diagram 950 illustrating the head-mounted display (HMD) 910 of FIG. 9A being worn by a user 920, in accordance with some examples. The user 920 wears the HMD 910 on the user 920's head over the user 920's eyes. The HMD 910 can capture images with the first camera 930A and the second camera 930B. In some examples, the HMD 910 displays one or more display images toward the user 920's eyes that are based on the images captured by the first camera 930A and the second camera 930B. The display images may provide a stereoscopic view of the environment, in some cases with information overlaid and/or with other modifications. For example, the HMD 910 can display a first display image to the user 920's right eye, the first display image based on an image captured by the first camera 930A. The HMD 910 can display a second display image to the user 920's left eye, the second display image based on an image captured by the second camera 930B. For instance, the HMD 910 may provide overlaid information in the display images overlaid over the images captured by the first camera 930A and the second camera 930B. As indicated above, the HMD 910 may also include a fifth camera 930E and sixth camera 930F. In some cases, the third camera 930C, fourth camera 930D, fifth camera 930E and sixth camera 930F may be used primarily for tracking and mapping and images captured by these cameras may not typically be displayed to the user 920.

The HMD 910 includes no wheels, propellers or other conveyance of its own. Instead, the HMD 910 relies on the movements of the user 920 to move the HMD 910 about the environment. Thus, in some cases, the HMD 910, when performing a SLAM technique, can skip path planning using a path planning engine and/or movement actuation using the movement actuator. In some cases, the HMD 910 can still perform path planning using a path planning engine, and can indicate directions to follow a suggested path to the user 920 to direct the user along the suggested path planned using the path planning engine. In some cases, for instance where the HMD 910 is a VR headset, the environment may be entirely or partially virtual. If the environment is at least partially virtual, then movement through the virtual environment may be virtual as well. For instance, movement through the virtual environment can be controlled by an input device 208. The movement actuator may include any such input device 208. Movement through the virtual environment may not require wheels, propellers, legs, or any other form of conveyance. If the environment is a virtual environment, then the HMD 910 can still perform path planning using the path planning engine and/or movement actuation. If the environment is a virtual environment, the HMD 910 can perform movement actuation using the movement actuator by performing a virtual movement within the virtual environment. Even if an environment is virtual, SLAM techniques may still be valuable, as the virtual environment can be unmapped and/or may have been generated by a device other than the HMD 910, such as a remote server or console associated with a video game or video game platform. In some cases, feature tracking and/or SLAM may be performed in a virtual environment even by vehicle or other device that has its own physical conveyance system that allows it to physically move about a physical environment. For example, SLAM may be performed in a virtual environment to test whether a SLAM system 300 is working properly without wasting time or energy on movement and without wearing out a physical conveyance system.

FIG. 10A is a perspective diagram 1000 illustrating a front surface 1055 of a mobile device 1050 that performs feature tracking and/or visual simultaneous localization and mapping (VSLAM) using one or more front-facing cameras 1030A-B, in accordance with some examples. The mobile device 1050 may be, for example, a cellular telephone, a satellite phone, a portable gaming console, a music player, a health tracking device, a wearable device, a wireless communication device, a laptop, a mobile device, any other type of computing device or computing system 1100 discussed herein, or a combination thereof. The front surface 1055 of the mobile device 1050 includes a display screen 1045. The front surface 1055 of the mobile device 1050 includes a first camera 1030A and a second camera 1030B. The first camera 1030A and the second camera 1030B are illustrated in a bezel around the display screen 1045 on the front surface 1055 of the mobile device 1050. In some examples, the first camera 1030A and the second camera 1030B can be positioned in a notch or cutout that is cut out from the display screen 1045 on the front surface 1055 of the mobile device 1050. In some examples, the first camera 1030A and the second camera 1030B can be under-display cameras that are positioned between the display screen 1045 and the rest of the mobile device 1050, so that light passes through a portion of the display screen 1045 before reaching the first camera 1030A and the second camera 1030B. The first camera 1030A and the second camera 1030B of the perspective diagram 1000 are front-facing cameras. The first camera 1030A and the second camera 1030B face a direction perpendicular to a planar surface of the front surface 1055 of the mobile device 1050. The first camera 1030A and the second camera 1030B may be two of the one or more cameras 310. In some examples, the front surface 1055 of the mobile device 1050 may only have a single camera. In some examples, the mobile device 1050 may include one or more additional cameras in addition to the first camera 1030A and the second camera 1030B. In some examples, the mobile device 1050 may include one or more additional sensors in addition to the first camera 1030A and the second camera 1030B.

FIG. 10B is a perspective diagram 1090 illustrating a rear surface 1065 of a mobile device 1050. The mobile device 1050 includes a third camera 1030C and a fourth camera 1030D on the rear surface 1065 of the mobile device 1050. The third camera 1030C and the fourth camera 1030D of the perspective diagram 1090 are rear-facing. The third camera 1030C and the fourth camera 1030D face a direction perpendicular to a planar surface of the rear surface 1065 of the mobile device 1050. While the rear surface 1065 of the mobile device 1050 does not have a display screen 1045 as illustrated in the perspective diagram 1090, in some examples, the rear surface 1065 of the mobile device 1050 may have a second display screen. If the rear surface 1065 of the mobile device 1050 has a display screen 1045, any positioning of the third camera 1030C and the fourth camera 1030D relative to the display screen 1045 may be used as discussed with respect to the first camera 1030A and the second camera 1030B at the front surface 1055 of the mobile device 1050. The third camera 1030C and the fourth camera 1030D may be two of the one or more cameras 310. In some examples, the rear surface 1065 of the mobile device 1050 may only have a single camera. In some examples, the mobile device 1050 may include one or more additional cameras in addition to the first camera 1030A, the second camera 1030B, the third camera 1030C, and the fourth camera 1030D. In some examples, the mobile device 1050 may include one or more additional sensors in addition to the first camera 1030A, the second camera 1030B, the third camera 1030C, and the fourth camera 1030D.

Like the HMD 910, the mobile device 1050 includes no wheels, propellers, or other conveyance of its own. Instead, the mobile device 1050 relies on the movements of a user holding or wearing the mobile device 1050 to move the mobile device 1050 about the environment. Thus, in some cases, the mobile device 1050, when performing a SLAM technique, can skip path planning using the path planning engine and/or movement actuation using the movement actuator. In some cases, the mobile device 1050 can still perform path planning using the path planning engine, and can indicate directions to follow a suggested path to the user to direct the user along the suggested path planned using the path planning engine. In some cases, for instance where the mobile device 1050 is used for AR, VR, MR, or XR, the environment may be entirely or partially virtual. In some cases, the mobile device 1050 may be slotted into a head-mounted device (HMD) (e.g., into a cradle of the HMD) so that the mobile device 1050 functions as a display of the HMD, with the display screen 1045 of the mobile device 1050 functioning as the display of the HMD. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile device 1050. The movement actuator may include any such input device. Movement through the virtual environment may not require wheels, propellers, legs, or any other form of conveyance. If the environment is a virtual environment, then the mobile device 1050 can still perform path planning using the path planning engine and/or movement actuation. If the environment is a virtual environment, the mobile device 1050 can perform movement actuation using the movement actuator by performing a virtual movement within the virtual environment FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some examples, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1. An apparatus for jitter correction, comprising: at least one memory; and at least one processor coupled to the at least one memory and configured to: receive a set of keypoints for an articulated object, wherein keypoints of the set of keypoints correspond to joints of the articulated object; determine a first keypoint of the set of keypoints is associated with a second keypoint of the set of keypoints; determine there is jitter associated with the first keypoint based on a comparison of a length between the first keypoint and the second keypoint to an expected length; and apply a filter to a location of the first keypoint based on the determination that there is jitter associated with the first keypoint.

Aspect 2. The apparatus of Aspect 1, wherein, to apply the filter, the at least one processor is configured to: determine a smoothing factor based on determining that there is jitter associated with the first keypoint; and smooth a movement of the first keypoint based on the determined smoothing factor.

Aspect 3. The apparatus of Aspect 2, wherein the smoothing factor is determined based on differences between an expected length and a measured length for the first keypoint and associated neighboring keypoints.

Aspect 4. The apparatus of any of Aspects 1-3, wherein the at least one processor is further configured to estimate a pose of the articulated object based on the filtered first keypoint.

Aspect 5. The apparatus of any of Aspects 1-4, wherein a first joint corresponding to the first keypoint of the articulated object is coupled to a second joint corresponding to the second keypoint of the articulated object by a rigid portion.

Aspect 6. The apparatus of Aspect 5, wherein the first keypoint is associated with the second keypoint based on the coupling.

Aspect 7. The apparatus of any of Aspects 1-7, wherein associations between keypoints are predetermined for the articulated object.

Aspect 8. The apparatus of any of Aspects 1-8, wherein, to determine there is jitter associated with the first keypoint, the at least one processor is configured to: obtain a measured length between the first keypoint and the second keypoint; obtain an expected length between the first keypoint and the second keypoint; and determine there is jitter associated with the first keypoint based on a difference between the measured length and the expected length.

Aspect 9. The apparatus of Aspect 8, wherein the at least one processor is configured to: determine that the difference between the measured length and the expected length is greater than a threshold distance; and determine that there is jitter associated with the first keypoint based on determining that the difference between the measured length and the expected length is greater than the threshold distance.

Aspect 10. The apparatus of any of Aspects 1-9, wherein the at least one processor is further configured to: obtain a measured length between a third keypoint and a fourth keypoint; obtain an expected length between the third keypoint and the fourth keypoint; determine that the measured length matches the expected length; and determine that there is no jitter associated with the third keypoint based on determining that the measured length matches the expected length.

Aspect 11. The apparatus of any of Aspects 1-10, wherein the keypoints are defined in a three-dimensional space.

Aspect 12. The apparatus of Aspect 11, wherein the length between the first keypoint and the second keypoint is measured in the three-dimensional space.

Aspect 13. The apparatus of any of Aspects 1-12, wherein the articulated object comprises fingers of a hand.

Aspect 14. A method for jitter correction, comprising: receiving a set of keypoints for an articulated object, wherein keypoints of the set of keypoints correspond to joints of the articulated object; determining a first keypoint of the set of keypoints is associated with a second keypoint of the set of keypoints; determining there is jitter associated with the first keypoint based on a comparison of a length between the first keypoint and the second keypoint to an expected length; and applying a filter to a location of the first keypoint based on the determination that there is jitter associated with the first keypoint.

Aspect 15. The method of Aspect 14, wherein applying the filter comprises: determining a smoothing factor based on determining that there is jitter associated with the first keypoint; and smoothing a movement of the first keypoint based on the determined smoothing factor.

Aspect 16. The method of Aspect 15, wherein the smoothing factor is determined based on differences between an expected length and a measured length for the first keypoint and associated neighbouring keypoints.

Aspect 17. The method of any of Aspects 14-16, further comprising estimating a pose of the articulated object based on the filtered first keypoint.

Aspect 18. The method of any of Aspects 14-17, wherein a first joint corresponding to the first keypoint of the articulated object is coupled to a second joint corresponding to the second keypoint of the articulated object by a rigid portion.

Aspect 19. The method of Aspect 18, wherein the first keypoint is associated with the second keypoint based on the coupling.

Aspect 20. The method of any of Aspects 14-19, wherein associations between keypoints are predetermined for the articulated object.

Aspect 21. The method of any of Aspects 14-20, wherein determining there is jitter associated with the first keypoint comprises: obtaining a measured length between the first keypoint and the second keypoint; obtaining an expected length between the first keypoint and the second keypoint; and determining there is jitter associated with the first keypoint based on a difference between the measured length and the expected length.

Aspect 22. The method of Aspect 21, further comprising: determining that the difference between the measured length and the expected length is greater than a threshold distance; and determining that there is jitter associated with the first keypoint based on determining that the difference between the measured length and the expected length is greater than the threshold distance.

Aspect 23. The method of any of Aspects 14-22, further comprising: obtaining a measured length between a third keypoint and a fourth keypoint; obtaining an expected length between the third keypoint and the fourth keypoint; determining that the measured length matches the expected length; and determining that there is no jitter associated with the third keypoint based on determining that the measured length matches the expected length.

Aspect 24. The method of any of Aspects 14-23, wherein the keypoints are defined in a three-dimensional space.

Aspect 25. The method of Aspect 24, wherein the length between the first keypoint and the second keypoint is measured in the three-dimensional space.

Aspect 26. The method of any of Aspects 14-25, wherein the articulated object comprises fingers of a hand.

Aspect 27. A non-transitory computer-readable medium having stored thereon instructions that, when executed by at least one processor, cause the at least one processor to: receive a set of keypoints for an articulated object, wherein keypoints of the set of keypoints correspond to joints of the articulated object; determine a first keypoint of the set of keypoints is associated with a second keypoint of the set of keypoints; determine there is jitter associated with the first keypoint based on a comparison of a length between the first keypoint and the second keypoint to an expected length; and apply a filter to a location of the first keypoint based on the determination that there is jitter associated with the first keypoint.

Aspect 28. The non-transitory computer-readable medium of Aspect 27, wherein, to apply the filter, the instructions cause the at least one processor to: determine a smoothing factor based on determining that there is jitter associated with the first keypoint; and smooth a movement of the first keypoint based on the determined smoothing factor.

Aspect 29. The non-transitory computer-readable medium of Aspect 28, wherein the smoothing factor is determined based on differences between an expected length and a measured length for the first keypoint and associated neighbouring keypoints.

Aspect 30. The non-transitory computer-readable medium of Aspect 27, wherein the instructions cause the at least one processor to estimate a pose of the articulated object based on the filtered first keypoint.

Aspect 31. A non-transitory computer-readable medium having stored thereon instructions that, when executed by one or more processors, cause the at one or more processors to perform operations according to any of aspects 14-26.

Aspect 32. An apparatus for jitter correction comprising one or more means for performing operations according to any of aspects 14-26.

Aspect 33: The apparatus of any of Aspects 1 to 13, wherein the apparatus is a mobile device.

What is claimed is:

1. An apparatus for jitter correction, comprising:
at least one memory; and
at least one processor coupled to the at least one memory and configured to:
receive a set of keypoints for an articulated object, wherein keypoints of the set of keypoints correspond to joints of the articulated object;
determine a first keypoint of the set of keypoints is associated with a second keypoint of the set of keypoints;

determine there is jitter associated with the first keypoint based on a comparison of a length between the first keypoint and the second keypoint to an expected length;

obtain a smoothing factor based on the determination that there is jitter associated with the first keypoint; and apply a filter to a location of the first keypoint based on the smoothing factor to reduce movement from the jitter over time.

2. The apparatus of claim 1, wherein, to apply the filter, the at least one processor is configured to:

smooth a movement of the first keypoint based on the determined smoothing factor.

3. The apparatus of claim 1, wherein the smoothing factor is determined based on differences between an expected length and a measured length for the first keypoint and associated neighbouring keypoints.

4. The apparatus of claim 1, wherein the at least one processor is further configured to estimate a pose of the articulated object based on the filtered first keypoint.

5. The apparatus of claim 1, wherein a first joint corresponding to the first keypoint of the articulated object is coupled to a second joint corresponding to the second keypoint of the articulated object by a rigid portion.

6. The apparatus of claim 5, wherein the first keypoint is associated with the second keypoint based on the coupling.

7. The apparatus of claim 1, wherein associations between keypoints are predetermined for the articulated object.

8. The apparatus of claim 1, wherein, to determine there is jitter associated with the first keypoint, the at least one processor is configured to:

obtain a measured length between the first keypoint and the second keypoint;

obtain an expected length between the first keypoint and the second keypoint; and determine there is jitter associated with the first keypoint based on a difference between the measured length and the expected length.

9. The apparatus of claim 8, wherein the at least one processor is configured to:

determine that the difference between the measured length and the expected length is greater than a threshold distance; and determine that there is jitter associated with the first keypoint based on determining that the difference between the measured length and the expected length is greater than the threshold distance.

10. The apparatus of claim 1, wherein the at least one processor is further configured to:

obtain a measured length between a third keypoint and a fourth keypoint;

obtain an expected length between the third keypoint and the fourth keypoint;

determine that the measured length matches the expected length; and determine that there is no jitter associated with the third keypoint based on determining that the measured length matches the expected length.

11. The apparatus of claim 1, wherein the keypoints are defined in a three-dimensional space.

12. The apparatus of claim 11, wherein the length between the first keypoint and the second keypoint is measured in the three-dimensional space.

13. The apparatus of claim 1, wherein the articulated object comprises fingers of a hand.

14. A method for jitter correction, comprising:

receiving a set of keypoints for an articulated object, wherein keypoints of the set of keypoints correspond to joints of the articulated object;

determining a first keypoint of the set of keypoints is associated with a second keypoint of the set of keypoints;

determining there is jitter associated with the first keypoint based on a comparison of a length between the first keypoint and the second keypoint to an expected length;

obtaining a smoothing factor based on the determination that there is jitter associated with the first keypoint; and applying a filter to a location of the first keypoint based on the smoothing factor to reduce movement from the jitter over time.

15. The method of claim 14, wherein applying the filter comprises:

smoothing a movement of the first keypoint based on the determined smoothing factor.

16. The method of claim 15, wherein the smoothing factor is determined based on differences between an expected length and a measured length for the first keypoint and associated neighbouring keypoints.

17. The method of claim 14, further comprising estimating a pose of the articulated object based on the filtered first keypoint.

18. The method of claim 14, wherein a first joint corresponding to the first keypoint of the articulated object is coupled to a second joint corresponding to the second keypoint of the articulated object by a rigid portion.

19. The method of claim 18, wherein the first keypoint is associated with the second keypoint based on the coupling.

20. The method of claim 14, wherein associations between keypoints are predetermined for the articulated object.

21. The method of claim 14, wherein determining there is jitter associated with the first keypoint comprises:

obtaining a measured length between the first keypoint and the second keypoint;

obtaining an expected length between the first keypoint and the second keypoint; and determining there is jitter associated with the first keypoint based on a difference between the measured length and the expected length.

22. The method of claim 21, further comprising:

determining that the difference between the measured length and the expected length is greater than a threshold distance; and determining that there is jitter associated with the first keypoint based on determining that the difference between the measured length and the expected length is greater than the threshold distance.

23. The method of claim 14, further comprising:

obtaining a measured length between a third keypoint and a fourth keypoint;

obtaining an expected length between the third keypoint and the fourth keypoint;

determining that the measured length matches the expected length; and determining that there is no jitter associated with the third keypoint based on determining that the measured length matches the expected length.

24. The method of claim 14, wherein the keypoints are defined in a three-dimensional space.

25. The method of claim 24, wherein the length between the first keypoint and the second keypoint is measured in the three-dimensional space.

26. The method of claim 14, wherein the articulated object comprises fingers of a hand.

27. A non-transitory computer-readable medium having stored thereon instructions that, when executed by at least one processor, cause the at least one processor to:

receive a set of keypoints for an articulated object, wherein keypoints of the set of keypoints correspond to joints of the articulated object;

determine a first keypoint of the set of keypoints is associated with a second keypoint of the set of keypoints;

determine there is jitter associated with the first keypoint based on a comparison of a length between the first keypoint and the second keypoint to an expected length;

obtain a smoothing factor based on the determination that there is jitter associated with the first keypoint; and apply a filter to a location of the first keypoint based on the smoothing factor to reduce movement from the jitter over time.

28. The non-transitory computer-readable medium of claim 27, wherein, to apply the filter, the instructions cause the at least one processor to:

smooth a movement of the first keypoint based on the determined smoothing factor.

29. The non-transitory computer-readable medium of claim 28, wherein the smoothing factor is determined based on differences between an expected length and a measured length for the first keypoint and associated neighbouring keypoints.

30. The non-transitory computer-readable medium of claim 27, wherein the instructions cause the at least one processor to estimate a pose of the articulated object based on the filtered first keypoint.

* * * * *